US009777362B2

(12) United States Patent
Kobayashi et al.

(10) Patent No.: US 9,777,362 B2
(45) Date of Patent: *Oct. 3, 2017

(54) ELECTRODE MANUFACTURING APPARATUS FOR LITHIUM ION CAPACITOR

(71) Applicant: Tokyo Electron Limited, Tokyo (JP)

(72) Inventors: Yoshiyuki Kobayashi, Miyagi (JP); Satoshi Taga, Miyagi (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/413,827

(22) Filed: Jan. 24, 2017

(65) Prior Publication Data

US 2017/0130312 A1    May 11, 2017

Related U.S. Application Data

(63) Continuation of application No. 14/132,403, filed on Dec. 18, 2013, now Pat. No. 9,587,300.

(30) Foreign Application Priority Data

Dec. 21, 2012 (JP) .................................. 2012-279685

(51) Int. Cl.
 *C23C 4/08* (2016.01)
 *C23C 4/137* (2016.01)
 (Continued)

(52) U.S. Cl.
 CPC .................. *C23C 4/08* (2013.01); *C23C 4/12* (2013.01); *C23C 4/137* (2016.01); *H01G 11/06* (2013.01);
 (Continued)

(58) Field of Classification Search
 None
 See application file for complete search history.

(56) References Cited

U.S. PATENT DOCUMENTS 2,253,176 A    8/1941  Graves
4,048,436 A    9/1977  Hiratake
(Continued)

FOREIGN PATENT DOCUMENTS

JP    09-022690 A    1/1997
JP    2006-055708 A    3/2006
(Continued)

OTHER PUBLICATIONS

European Search Report for 13 19 8068 dated Aug. 12, 2014.

*Primary Examiner* — Charles Capozzi
(74) *Attorney, Agent, or Firm* — Pearne & Gordon LLP

(57) ABSTRACT

A time for doping an electrode material on an electrode sheet with a lithium ion can be reduced. The electrode manufacturing apparatus includes a processing chamber 200 to and from which the electrode sheet is loaded and unloaded; and a lithium thermal spraying unit 210 configured to dope a carbon material C with the lithium ion by forming a lithium thin film on the carbon material of the electrode sheet W loaded into the processing chamber while melting and spraying lithium-containing powder. Further, the lithium thermal spraying unit 210 includes a lithium-containing powder supply unit 250 configured to discharge the lithium-containing powder toward the electrode material of the electrode sheet, and at least one heating gas supply unit 260 configured to supply a heating gas that melts the lithium-containing powder discharged from the lithium-containing powder supply unit.

3 Claims, 6 Drawing Sheets

(51) Int. Cl.
  *C23C 4/12* (2016.01)
  *H01M 10/0525* (2010.01)
  *H01M 4/04* (2006.01)
  *H01M 4/587* (2010.01)
  *H01G 11/50* (2013.01)
  *H01G 11/32* (2013.01)
  *H01G 11/86* (2013.01)
  *H01G 11/06* (2013.01)

(52) U.S. Cl.
  CPC ............ *H01G 11/32* (2013.01); *H01G 11/50* (2013.01); *H01G 11/86* (2013.01); *H01M 4/0419* (2013.01); *H01M 4/587* (2013.01); *H01M 10/0525* (2013.01)

(56) References Cited

U.S. PATENT DOCUMENTS

| | | |
|---|---|---|
| 4,370,538 A | 1/1983 | Browning |
| 4,888,206 A | 12/1989 | Hope |
| 2012/0064225 A1 | 3/2012 | Bachrach |

FOREIGN PATENT DOCUMENTS

| | | |
|---|---|---|
| JP | 2010-080858 A | 4/2010 |
| JP | 2012-199460 A | 10/2012 |
| WO | 2012/036908 A2 | 3/2012 |

ELECTRODE MANUFACTURING APPARATUS FOR LITHIUM ION CAPACITOR

CROSS-REFERENCE TO RELATED APPLICATION

This is a continuation application of U.S. patent application Ser. No. 14/132,403, filed on Dec. 18, 2013 which claims the benefit of Japanese Patent Application No. 2012-279685 filed on Dec. 21, 2012, the entire disclosures of which are incorporated herein by reference.

TECHNICAL FIELD

The embodiment described herein pertains generally to an electrode manufacturing apparatus for a lithium ion capacitor.

BACKGROUND

A process for manufacturing an electrode for a lithium ion capacitor such as a lithium ion secondary battery includes a pre-doping process in which an electrode material is doped in advance with a lithium ion. By way of example, when a negative electrode (anode) of a lithium ion secondary battery is manufactured, a carbon material such as activated carbon used as an electrode material is doped with a lithium ion.

Conventionally, in such a lithium ion doping process, a carbon material is immersed in a doping tank filled with an electrolyte containing a lithium ion to be doped with the lithium ion (see, for example, Patent Document 1).

Patent Document 1: Japanese Patent Laid-open Publication No. H09-022690

However, in the conventional lithium ion doping process, it takes a long time, e.g., several days, to uniformly dope the entire carbon material with the lithium ion. Due to a long time for the conventional lithium ion doping process, the production efficiency of a lithium ion capacitor is reduced.

SUMMARY

In view of the foregoing problems, an example embodiment provides an electrode manufacturing apparatus which can greatly reduce a time for doping an electrode material with a lithium ion.

In one example embodiment, an apparatus of manufacturing an electrode for a lithium ion capacitor by doping an electrode material (e.g., a carbon material) on an electrode sheet with a lithium ion includes a processing chamber to and from which the electrode sheet is loaded and unloaded; a rare gas supply unit configured to introduce a rare gas into the processing chamber; an exhaust device configured to exhaust an inside of the processing chamber to a preset vacuum level; and a lithium thermal spraying unit configured to dope the electrode material with the lithium ion by forming a lithium thin film on the electrode material of the electrode sheet loaded into the processing chamber while melting and spraying lithium-containing powder.

The lithium thermal spraying unit may include a lithium-containing powder supply unit configured to discharge the lithium-containing powder toward the electrode material of the electrode sheet; and at least one heating gas supply unit configured to supply a heating gas that melts the lithium-containing powder discharged from the lithium-containing powder supply unit.

The lithium-containing powder supply unit may be provided perpendicularly to the electrode material, and the at least one heating gas supply unit may be arranged to be inclined to the lithium-containing powder supply unit such that the heating gas is discharged toward a space between a powder discharge opening of the lithium-containing powder supply unit and the electrode material.

The electrode sheet may be formed in a roll shape, and accommodation chambers configured to accommodate the electrode sheet may be respectively provided at both sides of the processing chamber to be communicated with each other. Further, the electrode sheet may be unwound in one of the accommodation chambers to pass through the processing chamber, and then, may be wound in the other accommodation chamber. Furthermore, the lithium thermal spraying unit may form the lithium thin film on the electrode material while the electrode sheet is unwound and passes through the processing chamber.

The lithium-containing powder supply unit may be a substantially plate-shaped member in which multiple holes are formed, and the plate-shaped member may be extended in a width direction of the electrode sheet and arranged perpendicularly to the electrode sheet. Further, the holes through which the lithium-containing powder is supplied may be arranged in the width direction of the electrode sheet. Furthermore, the at least one heating gas supply unit may be plural in number, and two heating gas supply units may be arranged to be symmetrical with respect to each hole of the lithium-containing powder supply unit in a longitudinal direction of the electrode sheet.

In another example embodiment, a method of manufacturing an electrode for a lithium ion capacitor by doping an electrode material on an electrode sheet with a lithium ion includes depressurizing an inside of a processing chamber, to and from which the electrode sheet is loaded and unloaded, under a rare gas atmosphere; and doping the electrode material with the lithium ion by forming a lithium thin film on the electrode material of the electrode sheet loaded into the processing chamber while melting and spraying lithium-containing powder.

According to the example embodiments, while melting and spraying the lithium-containing powder, the electrode material is doped with the lithium ion by forming the lithium thin film on the electrode material of the electrode sheet loaded into the processing chamber under the rare gas atmosphere. As a result, it is possible to greatly reduce a time for doping the electrode material with the lithium ion. The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
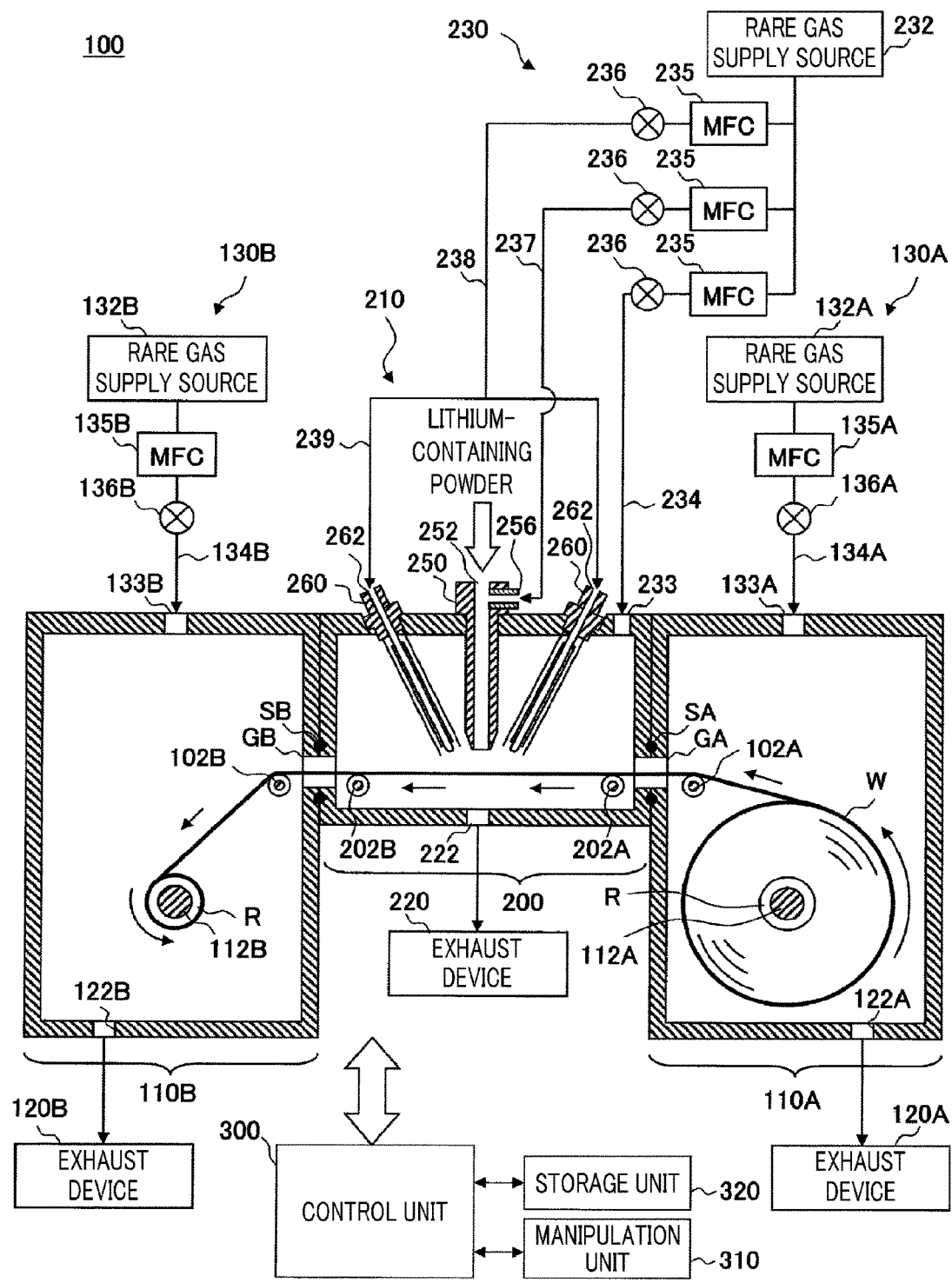
FIG. 1 is a cross sectional view illustrating a configuration example of an electrode manufacturing apparatus in accordance with an example embodiment.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example. Still, the examples described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

(Configuration Example of Electrode Manufacturing Apparatus for Lithium Ion Capacitor)

An apparatus of manufacturing an electrode for a lithium ion capacitor (hereinafter, referred to as "electrode manufacturing apparatus") in accordance with an example embodiment will be explained with reference to the accompanying drawings. Herein, there will be exemplified an electrode manufacturing apparatus (doping apparatus) configured to perform a process for doping an electrode material on an electrode sheet with a lithium ion as a process for manufacturing a negative electrode (anode) used in a lithium ion capacitor such as a lithium ion secondary battery.

Figure 2:
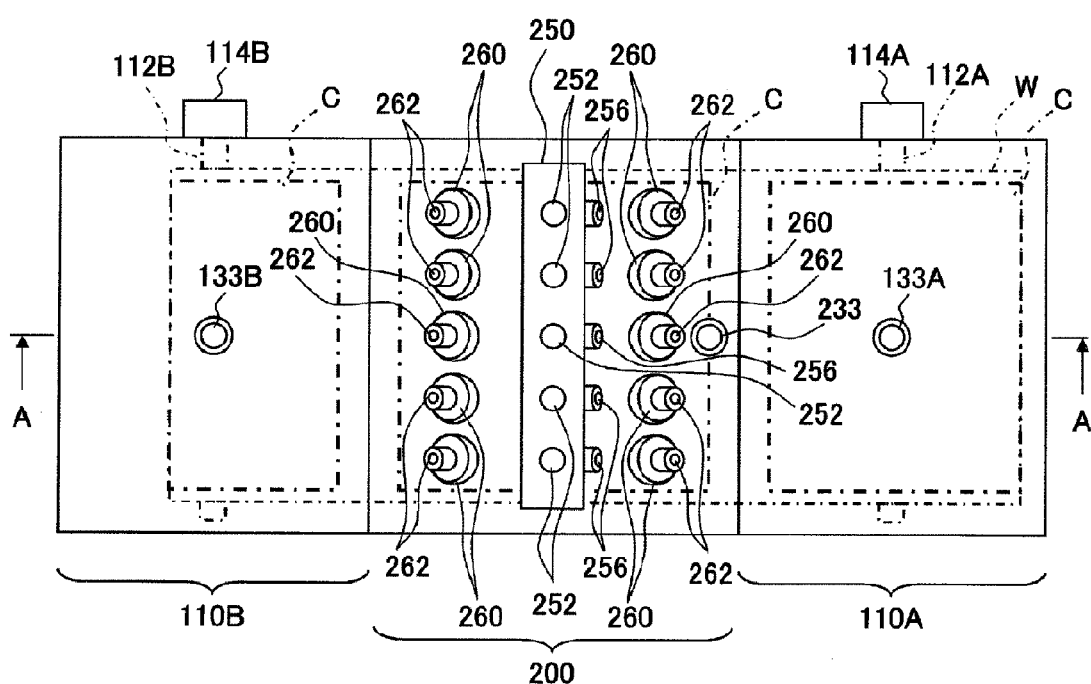
FIG. 2 is a top view of the electrode manufacturing apparatus of FIG. 1.
Figure 3:
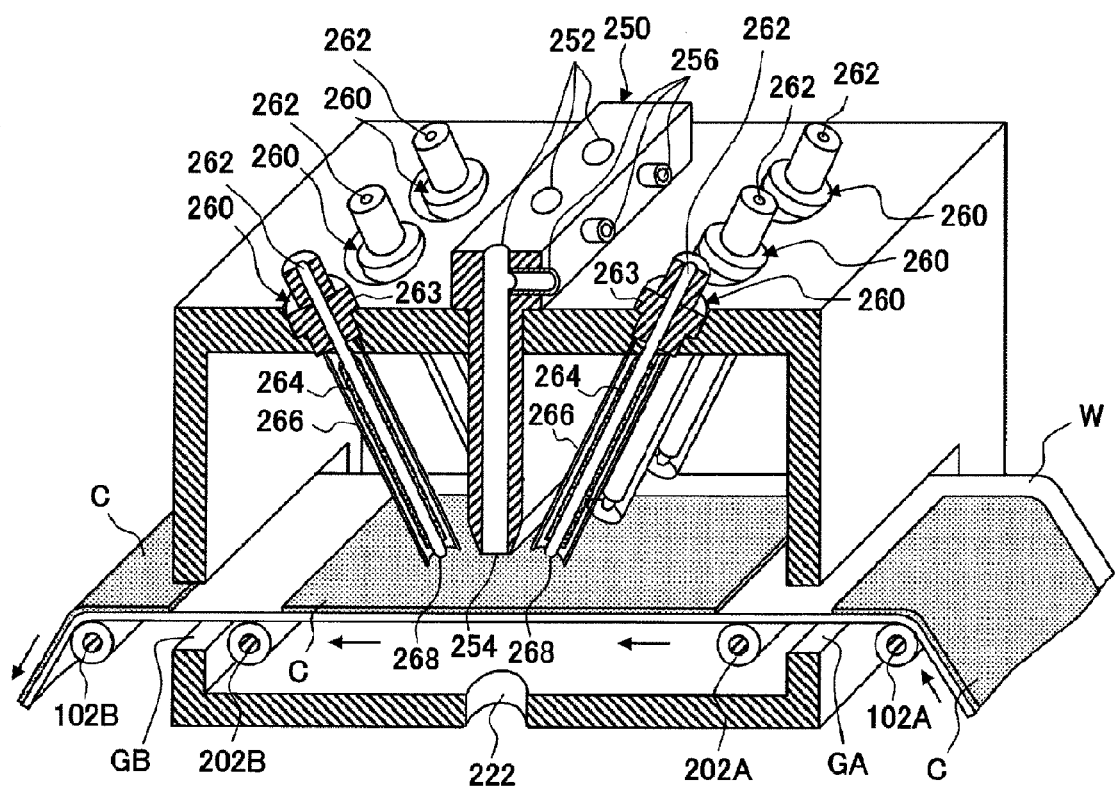
FIG. 3 is a cross sectional perspective view of a processing chamber of FIG. 1 when taken along a line A-A of FIG. 2.

FIG. 1 is a cross sectional view illustrating a schematic configuration of the electrode manufacturing apparatus in accordance with the present example embodiment. FIG. 2 is a top view of the electrode manufacturing apparatus of FIG. 1. FIG. 1 is a longitudinal cross sectional view taken along a line A-A of FIG. 2. FIG. 3 is also a cross sectional perspective view of a processing chamber depicted in FIG. 1.

An electrode manufacturing apparatus 100 in accordance with the present example embodiment is configured to form a film on an electrode material formed on a roll-shaped electrode sheet by thermal spraying of lithium in a processing chamber while winding and unwinding the roll-shaped electrode sheet. The processing chamber is in a rare gas atmosphere while being evacuated. Thus, by forming a lithium thin film on the electrode material by the thermal spraying of the lithium, the electrode material can be doped with a lithium ion. Herein, a carbon material such as activated carbon will be exemplified as the electrode material of the electrode sheet.

To be specific, as depicted in FIG. 1, the electrode manufacturing apparatus 100 in accordance with the present example embodiment includes an unwinding-side accommodation chamber 110A configured to accommodate a roll-shaped electrode sheet W therein, a winding-side accommodation chamber 110B provided away from the accommodation chamber 110A, and a processing chamber 200 provided between the accommodation chambers 110A and 110B. Each of the accommodation chambers 110A and 110B, and the processing chamber 200 is formed of an airtight housing made of metal such as stainless steel or aluminum. Further, by way of example, an opening which can be blocked by a cover member or a door member may be formed at a front surface of each of the accommodation chambers 110A and 110B to allow the electrode sheet W to be loaded or unloaded.

The processing chamber 200 and the unwinding-side accommodation chamber 110A communicate with each other by a communication hole GA. The roll-shaped electrode sheet W unwound in the unwinding-side accommodation chamber 110A is transferred into the processing chamber 200 through the communication hole GA.

The processing chamber 200 and the winding-side accommodation chamber 110B communicate with each other by a communication hole GB. The electrode sheet W processed in the processing chamber 200 is unloaded from the processing chamber 200 through the communication hole GB to the winding-side accommodation chamber 110B to be wound in the winding-side accommodation chamber 110B. When the electrode sheet W processed as described above is wound, a processing surface thereof may be coated with a resin (for example, a resin film) that is easily peeled off while being wound.

Further, between the processing chamber 200 and the respective accommodation chambers 110A and 110B, sealing members SA and SB, such as O-rings, surrounding the respective communication holes GA and GB are provided to airtightly seal them.

The accommodation chambers 110A and 110B include exhaust openings 122A and 122B connected to exhaust devices 120A and 120B that are configured to exhaust insides of the accommodation chambers 110A and 110B, respectively. The processing chamber 200 includes an exhaust opening 222 connected to an exhaust device 220 that is configured to exhaust an inside of the processing chamber 200. The exhaust devices 120A, 120B, and 220 may be formed of vacuum pumps, respectively, and provided separately.

With the exhaust devices 120A, 120B, and 220, pressures inside the accommodation chambers 110A and 110B, and the processing chamber 200 can be adjusted separately and respectively. With such devices, there may be generated a pressure difference between the accommodation chambers 110A and 110B and the processing chamber 200. By way of example, in order to suppress internal atmospheres of the respective accommodation chambers 110A and 110B together with particles or the like from being introduced into the processing chamber 200 through the communication holes GA and GB, pressures inside the accommodation chambers 110A and 110B may be adjusted to be lower than a pressure inside the processing chamber 200. Further, it is not necessary to separately provide the exhaust devices 120A and 120B of the accommodation chambers 110A and 110B, and a single common exhaust device may be provided.

The unwinding-side accommodation chamber 110A includes an unwinding shaft 112A, and the winding-side accommodation chamber 110B includes a winding shaft 112B. When the roll-shaped electrode sheet W is set on the unwinding shaft 112A, for example, a central portion of the roll-shaped electrode sheet W is inserted into the unwinding shaft 112A to be supported.

The unwinding shaft 112A and the winding shaft 112B are rotatably supported in the accommodation chambers 110A and 110B, respectively. In this case, each of the unwinding shaft 112A and the winding shaft 112B may be supported at one side thereof or both sides thereof. As depicted in FIG. 2, the unwinding shaft 112A and the winding shaft 112B are respectively connected to motors 114A and 114B provided outside the accommodation chambers 110A and 110B. The unwinding shaft 112A and the winding shaft 112B are configured to be forwardly rotated or reversely (inversely) rotated by the motors 114A and 114B, respectively. Thus, the electrode sheet W can be transferred in a transfer direction as indicted by an arrow of FIG. 1 in which the electrode sheet W is transferred from the unwinding shaft 112A to the winding shaft 112B. Further, the electrode sheet W can also be transferred in the opposite direction to the direction indicated by the arrow of FIG. 1, i.e. from the winding shaft 112B to the unwinding shaft 112A.

In the respective accommodation chambers 110A and 110B, guide rollers 102A and 102B configured to transfer the electrode sheet W are provided. Further, in the processing chamber 200, guide rollers 202A and 202B configured to transfer the electrode sheet W are provided at sides of the accommodation chambers 110A and 110B, respectively. The electrode sheet W set on the unwinding shaft 112A is extended to the winding shaft 112B through the communication holes GA and GB via the multiple guide rollers 102A, 202A, 202B, and 102B. Further, the number and arrangement of the guide rollers are not limited thereto. In addition to the guide rollers, a tension roller configured to adjust tension of the electrode sheet W may be provided.

The processing chamber 200 includes a lithium thermal spraying unit 210 at a ceiling portion thereof. The lithium thermal spraying unit 210 is configured to dope a carbon material C with a lithium ion by forming a lithium thin film on the carbon material C as an electrode material of the electrode sheet W loaded into the processing chamber 200 while melting lithium-containing powder (lithium powder or the like).

As depicted in FIG. 3, the lithium thermal spraying unit 210 includes a lithium-containing powder supply unit 250 configured to discharge and supply the lithium-containing powder toward the carbon material C of the electrode sheet W and a heating gas supply unit 260 configured to melt the lithium-containing powder by supplying a heating gas (a rare gas such as argon heated to a certain temperature) for melting the lithium-containing powder discharged from the lithium-containing powder supply unit 250.

The lithium-containing powder supply unit 250 is a substantially plate-shaped member in which multiple holes 252 are formed. The plate-shaped member is extended in a width direction of the electrode sheet W and arranged perpendicularly to the electrode sheet W. Further, the multiple holes 252 are formed in the plate-shaped member in a longitudinal direction (vertical direction) thereof, and the lithium-containing powder is supplied through the holes 252. Each of the holes 252 penetrates the lithium-containing powder supply unit 250 to a lower end thereof, and the lithium-containing powder is discharged through a powder discharge opening 254 at the lower end. At a side portion of a base end of each hole 252, there is formed a gas inlet opening 256 through which a rare gas, such as argon, serving as a carrier gas of the lithium-containing powder is introduced.

As depicted in FIG. 2, the multiple holes 252 are arranged to be equi-spaced from each other in the width direction of the electrode sheet W. Further, desirably, the number and arrangement of the holes 252 may be determined such that a lithium thin film is continuously formed without being cut in the width direction of the carbon material (in a direction perpendicular to the transfer direction) of the electrode sheet W. Although, in FIG. 2, the lithium-containing powder supply unit 250 including five holes 252 is exemplified, the number of the holes 252 is not limited thereto and may be four or less or six or more.

With this configuration of the lithium-containing powder supply unit 250, by introducing an argon gas through the gas inlet opening 256, the lithium-containing powder passing through the respective holes 252 is discharged from the powder discharge opening 254 at the lower end thereof to be sprayed onto the carbon material C of the electrode sheet W. By controlling a flow rate of the argon gas introduced through the gas inlet opening 256, a discharge speed of the lithium-containing powder can be adjusted.

Further, lithium contained in the lithium-containing powder is highly reactive and easily ignitable. Therefore, a gas, which does not react with the lithium, such as a rare gas including an argon gas, is used as a carrier gas. Thus, it is possible to suppress spontaneous ignition of the lithium.

The heating gas supply unit 260 is formed in a substantially cylinder shape as depicted in FIG. 3. The heating gas supply unit 260 depicted in FIG. 3 is configured by wrapping a heater 264 around a gas line 262 through which a rare gas such as an argon gas passes. As depicted in FIG. 3, a base end of the gas line 262 is supported by a supporting member 263 made of ceramic or the like, and a glass pipe 266 made of quartz glass or the like may be provided at a front end side than the supporting member 263. The gas line 262 may be arranged within the glass pipe 266. With this configuration, it is possible to stably maintain a temperature of the rare gas.

In the heating gas supply unit 260, when the heater 264 is turned on and the rare gas is introduced from the base end of the gas line 262, the rare gas passing through the gas line 262 is heated by the heater 264 and the heated rare gas is discharged through a gas discharge opening 268 at a front end of the gas line 262. Thus, by arranging the heating gas supply unit 260 to supply the heated rare gas to the lithium-containing powder discharged through the powder discharge opening 254 of the lithium-containing powder supply unit 250, the lithium-containing powder can be melted to be sprayed onto the carbon material C of the electrode sheet W.

Herein, as the lithium-containing powder, for example, lithium metal powder coated with a phosphorus-containing compound or the like may be used. Since this lithium metal powder is very stable in the air and thus easy to handle. Further, by heating the lithium metal powder to a temperature higher than the melting point of lithium, the lithium metal powder is melted and lithium is obtained. In the present example embodiment, since the lithium metal powder is heated with the heating gas, the lithium can be sprayed onto the electrode material. Further, the lithium-containing powder is not limited thereto.

Desirably, the number and arrangement of the heating gas supply unit 260 may be determined depending on the number and arrangement of the holes 252 of the lithium-containing powder supply unit 250 as depicted in FIG. 3. FIG. 3 illustrates an example where two heating gas supply units 260 are provided with respect to one hole 252 of the lithium-containing powder supply unit 250. To be specific, with respect to one hole 252 of the lithium-containing powder supply unit 250, two heating gas supply units 260 are arranged in a symmetrical manner on both sides of the electrode sheet W in a longitudinal direction thereof.

In this case, two heating gas supply units 260 are arranged such that a heating gas from the heating gas supply units 260 can be supplied between the powder discharge opening 254 of the hole 252 and the carbon material C of the electrode sheet W. To be specific, two heating gas supply units 260 are arranged to be inclined at an acute angle to the lithium-containing powder supply unit 250 (hole 252).

With this configuration, the lithium-containing powder discharged from the powder discharge opening 254 of each hole 252 is heated with a heating gas to be melted. Thus, since the lithium is sprayed toward the carbon material C of the electrode sheet W, a lithium thin film can be formed on carbon material C at a high speed. Thus, it is possible to greatly reduce a time for doping the carbon material C with a lithium ion.

However, since the lithium is highly reactive, if a lithium film is formed in the atmosphere (in the air), the lithium is highly likely to be spontaneously ignited. In this regard, by spraying the lithium under the rare gas atmosphere such as an argon gas, it is possible to form a lithium film without being spontaneously ignited.

Therefore, in the electrode manufacturing apparatus 100 in accordance with the present example embodiment, a rare gas supply unit is provided, and a rare gas is used as the carrier gas of the lithium-containing powder supply unit 250 or the heating gas of the heating gas supply unit 260. Further, the rare gas is also introduced into the processing chamber 200 and the respective accommodation chambers 110A and 110B communicating with the processing chamber 200, so that a lithium film can be formed under the rare gas atmosphere.

Hereinafter, a specific configuration example of the rare gas supply unit will be explained with reference to the accompanying drawings. FIG. 1 illustrates an example where a rare gas is introduced into each of the processing chamber 200 and the accommodation chambers 110A and 110B while a flow rate thereof is separately controlled. Further, as described above, an argon gas may be used as the rare gas, but any rare gas may be used.

As depicted in FIG. 1, the accommodation chambers 110A and 110B respectively include rare gas supply units 130A and 130B configured to supply a rare gas (herein, an argon gas). The rare gas supply units 130A and 130B include rare gas supply sources 132A and 132B, respectively. The rare gas supply sources 132A and 132B are respectively connected to gas inlet openings 133A and 133B of the accommodation chambers 110A and 110B via lines 134A and 134B.

The lines 134A and 134B respectively include mass flow controllers (MFC) 135A and 135B as flow rate controllers configured to control flow rates of rare gases and opening/closing valves 136A and 136B.

The processing chamber 200 includes a rare gas supply unit 230 configured to supply a rare gas (herein, an argon gas). The rare gas supply unit 230 includes a rare gas supply source 232. The rare gas supply source 232 is connected to a gas inlet opening 233 of the processing chamber 200 via a line 234 and connected to the gas inlet opening 256 of the lithium-containing powder supply unit 250 via a line 237. Further, the rare gas supply source 232 is also connected to gas lines 262 of the respective heating gas supply units 260 via a line 238 and multiple branch lines 239 branched from the line 238.

The lines 234, 237, and 238 respectively include mass flow controllers (MFC) 235 as flow rate controllers configured to control flow rates of rare gases and opening/closing valves 236. With this configuration, flow rates of rare gases to be supplied into the processing chamber 200, the lithium-containing powder supply unit 250, and the heating gas supply unit 260 can be controlled separately.

Further, in the present example embodiment, there has been explained a case where the rare gas supply sources 132A, 132B, and 232 are provided separately, but the example embodiment is not limited thereto. If the same kind of rare gases are used, a single common rare gas supply source may be provided at the processing chamber 200 and the accommodation chambers 110A and 110B. Further, a flow rate controller configured to control a flow rate of a rare gas is not limited to a mass flow controller (MFC).

As depicted in FIG. 1, the electrode manufacturing apparatus 100 includes a control unit 300 configured to control the respective components thereof. The control unit 300 is connected to a manipulation unit 310 implemented as a keyboard or a display through which an operator inputs commands to manipulate the electrode manufacturing apparatus 100. The manipulation unit 310 may be implemented as a touch panel.

Further, the control unit 300 is connected to a storage unit 320 configured to store a program for performing an electrode manufacturing process to be described later in the electrode manufacturing apparatus 100 under the control of the control unit 300, recipe data (for example, preset pressures inside the processing chamber 200 and the accommodation chambers 110A and 110B, a winding speed of the electrode sheet W, and the like) required to execute the program, and the like.

Furthermore, such recipes may be stored in a hard disc or a semiconductor memory, or may be set in a preset area of the storage unit 320 while being stored in a storage medium readable by a portable computer such as a CD-ROM or a DVD.

The control unit 300 reads out a desired process recipe from the storage unit 320 in response to an instruction from the manipulation unit 310 and controls each component, so that a desired process is carried out in the electrode manufacturing apparatus 100. Further, the recipes can be changed by the manipulation unit 310.

(Roll-Shaped Electrode Sheet)

Hereinafter, there will be explained a roll-shaped electrode sheet to be used in a doping process with a lithium ion when an electrode manufacturing process is performed in the electrode manufacturing apparatus 100. Herein, there will be exemplified a roll-shaped electrode sheet to be used to manufacture a negative electrode of a lithium ion secondary battery.

By way of example, a lithium ion secondary battery is formed by stacking a positive electrode and a negative electrode with a separator interposed therebetween to be accommodated in a battery case and implanting an electrolyte therein. Each of these positive and negative electrodes is manufactured by previously cutting a roll-shaped electrode sheet into a piece having a length or shape as required.

In the present example embodiment, a roll-shaped electrode sheet of a negative pole is manufactured by doping an electrode material on the roll-shaped electrode sheet W with a lithium ion and winding the electrode sheet into a roll shape again. In accordance with the present example embodiment, as the roll-shaped electrode sheet W which is not yet doped with a lithium ion, for example, as depicted in FIG. 3, a base sheet which is made of a resin or metal and on which the carbon material C as an electrode material is formed to be equi-spaced from each other may be used.

Herein, the carbon material C may be graphite, activated carbon, soft carbon (graphitization-easy carbonaceous material), hard carbon (graphitization-resistant carbonaceous material), or the like, but herein, activated carbon, as the carbon material C, having a higher capacity than graphite is used. Further, an electrode material to be doped with a lithium ion is not limited to these carbon materials, and may include silicon or compounds containing silicon, or tin or compounds containing tin.

(Electrode Manufacturing Process)

Figure 4:
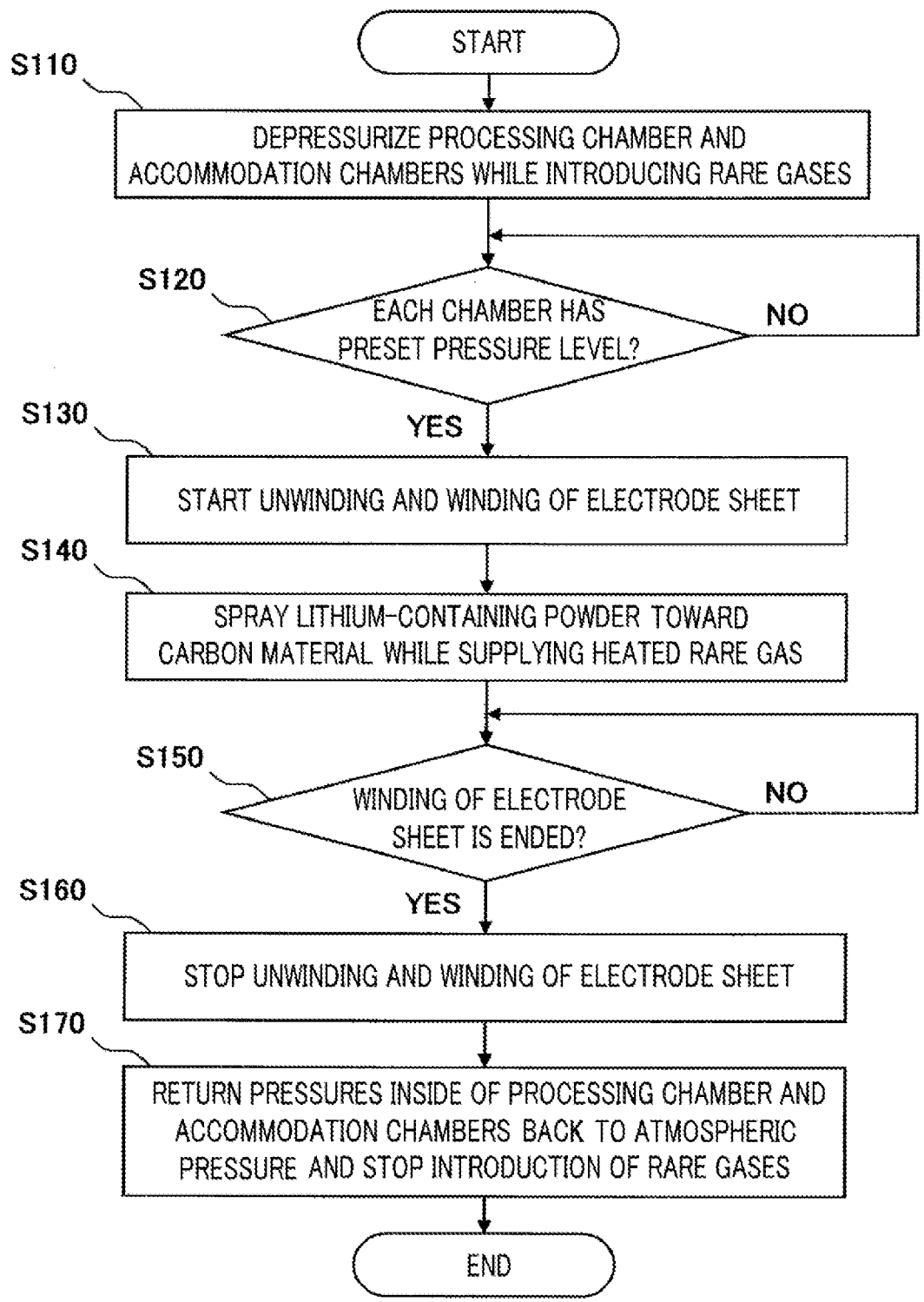
FIG. 4 is a flow chart illustrating an example of an electrode manufacturing process in accordance with the example embodiment.

Hereinafter, there will be explained an electrode manufacturing process (method) for manufacturing a roll-shaped electrode sheet of a negative pole for the lithium ion secondary battery with reference to the accompanying drawings. In the electrode manufacturing process, the electrode sheet W on which the carbon material C is formed is doped with a lithium ion by using the electrode manufacturing apparatus 100 in accordance with the present example embodiment. The control unit 300 controls the respective components of the electrode manufacturing apparatus 100 based on a preset program to perform a doping process. FIG. 4 is a flow chart illustrating an example of an electrode manufacturing process in accordance with the present example embodiment.

The electrode manufacturing process (doping process) is started by setting the roll-shaped electrode sheet W in the electrode manufacturing apparatus 100 and pressing a process start button provided in, for example, the manipulation unit 310. To be specific, a roll core R of the roll-shaped electrode sheet W is inserted and fixed to the unwinding shaft 112A, and the electrode sheet W is unwound and extended on the respective guide rollers 102A, 202A, 202B, and 102B and then wound on a roller core R set on the winding shaft 112B. By pressing the process start button, the process is started.

When the electrode manufacturing process is started, at block S110 (Depressurize Processing Chamber and Accommodation Chambers While Introducing Rare Gases), the control unit 300 exhausts and depressurizes the processing chamber 200 and the accommodation chambers 110A and 110B while introducing rare gases thereinto. To be specific, rare gases are supplied from the rare gas supply sources 132A and 132B into the accommodation chambers 110A and 110B at preset flow rates, respectively, and a rare gas is supplied from the rare gas supply source 232 into the processing chamber 200 at a preset flow rate. Herein, as the rare gases, an argon gas is used.

When the processing chamber 200 and the accommodation chambers 110A and 110B are depressurized, the insides of the accommodation chambers 110A and 110B are exhausted by operating the exhaust devices 120A and 120B, respectively, and the inside of the processing chamber 200 is exhausted by operating the exhaust device 220. Thus, each chamber is depressurized to a preset vacuum level. Processing may proceed from block S110 to block S120.

Then, at block S120 (Determine whether Each Chamber Has Preset Pressure Level), it is determined whether or not the processing chamber 200 and the accommodation chambers 110A and 110B have preset pressure levels (vacuum levels). To be specific, each pressure in the chambers is monitored by, for example, a non-illustrated pressure sensor. The processing chamber 200 is depressurized to a preset pressure level of about 100 Torr, and the respective accommodation chambers 110A and 110B are depressurized to pressure levels higher than the pressure level of the processing chamber 200. Processing may proceed from block S120 to block S130.

If it is determined that the processing chamber 200 and the accommodation chambers 110A and 110B have the preset pressure levels at block S120, the respective exhaust devices 120A, 120B, and 220 are controlled to maintain such preset pressures. Then, at block S130 (Start Unwinding and Winding of Electrode Sheet), unwinding and winding of the electrode sheet W is started.

To be specific, the motors 114A and 114B are operated to rotate the unwinding shaft 112A and the winding shaft 112B such that the roll-shaped electrode sheet W is unwound from the unwinding-side accommodation chamber 110A and passes through the processing chamber 200, and then, is wound on the winding shaft 112B of the winding-side accommodation chamber 110B. Thus, the electrode sheet W is transferred along the direction indicated by the arrow of FIG. 1. Processing may proceed from block S130 to block S140.

Then, at block S140 (Spray Lithium-containing Powder toward Carbon Material While Supplying Heated Rare Gas), when the electrode sheet W passes through the processing chamber 200, a lithium ion is doped on the carbon material C. To be specific, while a rare gas heated in the heating gas supply unit 260 is supplied onto the carbon material C of the electrode sheet W, lithium-containing powder together with a rare gas is sprayed from the lithium-containing powder supply unit 250.

In this way, lithium is doped onto the carbon material C of the electrode sheet W at a high speed. Then, the electrode sheet W after the doping process is wound on the winding shaft 112B without being exposed to the air.

Further, when the doping process is performed, a discharge speed of the lithium-containing powder from the lithium-containing powder supply unit 250 and a discharge speed of the heating gas from the heating gas supply unit 260 can be respectively adjusted by controlling flow rates of the rare gases with the mass flow controllers (MFC) 235.

Furthermore, a heating temperature of the rare gas discharged from the heating gas supply unit 260 can be adjusted by controlling a set temperature of the heater 264. Herein, desirably, the set temperature may be at least a temperature at which lithium can be melted, i.e. about the melting point of lithium (about 180° C.). However, in order to suppress ignition of lithium, the set temperature is lower than the boiling point of lithium (about 1347° C.). Herein, a set temperature of the heater 264 of each heating gas supply unit 260 is, for example, about 200° C.

Further, if a slight temperature difference occurs in the processing chamber 200 due to the large width of the electrode sheet W, a set temperature of the heater 264 of each heating gas supply unit 260 may be adjusted separately in order to correct the difference.

Furthermore, a thickness of the lithium film formed on the carbon material C can be controlled by adjusting an amount of the lithium-containing powder or a flow rate of the rare gas supplied from the lithium-containing powder supply unit 250. Moreover, a thickness of the lithium film can be controlled by adjusting a transfer speed of the electrode sheet W. By way of example, in order to increase a thickness of the lithium film, a transfer speed of the electrode sheet W is decreased, and in order to decrease a thickness of the lithium film, a transfer speed of the electrode sheet W is increased.

Further, by repeating forward rotation and reverse rotation of the electrode sheet W in a range of the carbon material C, a thickness of the lithium film can be controlled. Accordingly, a thickness of the lithium film can be controlled depending on the number of repetition of forward rotation and reverse rotation of the electrode sheet W. Processing may proceed from block S140 to block S150.

Then, at block S150 (Determine whether Winding of Electrode Sheet Is Ended), it is determined whether or not the winding of the electrode sheet W is ended. Whether or not the winding of the electrode sheet W is ended may be determined by detecting a wound diameter of the electrode sheet W with, for example, a non-illustrated wound diameter sensor or may be determined based on a change in torque output of the motor 114B configured to rotate the winding shaft 112B. Processing may proceed from block S150 to block S160.

If it is determined that the winding of the electrode sheet W is ended at block S150, rotation of the unwinding shaft 112A and the winding shaft 112B is stopped. Then, at block S160 (Stop Unwinding and Winding of Electrode Sheet), the winding and unwinding of the electrode sheet W is stopped. Processing may proceed from block S160 to block S170. At block S170 (Return Pressures inside of Processing Chamber and Accommodation Chambers back to Atmospheric Pressure and Stop Introduction of Rare gases), the pressures inside of the processing chamber 200 and the accommodation chambers 110A and 110B are returned back to the atmospheric pressure and introduction of the rare gases into the processing chamber 200 and the accommodation chambers 110A and 110B is stopped. When the returning to the atmospheric pressure is completed, the processed roll-shaped electrode sheet W as depicted in FIG. 1 can be taken out.

Thus, in the electrode manufacturing process by the electrode manufacturing apparatus 100 in accordance with the present example embodiment, since a lithium thin film is formed on an electrode material of the electrode sheet W while lithium-containing powder is melted and sprayed, the lithium thin film can be formed at a high speed. Therefore, a time for doping a carbon material with a lithium ion can be remarkably reduced as compared with a conventional method in which a carbon material is doped with a lithium ion in an electrolyte. Further, it is possible to cope with various shapes of a lithium ion capacitor.

Further, in the present example embodiment, the lithium thin film is formed by the thermal spraying of lithium. Therefore, even if an electrode material is not formed in a sheet shape (plane shape) as exemplified in the present example embodiment, any kind of shape (for example, three-dimensional shape) of the electrode material can be doped with a lithium ion.

Furthermore, the lithium-containing powder used in the present example embodiment is stable in the atmosphere to be easy to handle. However, lithium is highly reactive and highly likely to be spontaneously ignited in the air to be difficult to handle. In this regard, in the present example embodiment, outside the electrode manufacturing apparatus 100, the stable lithium-containing powder is handled, and during a doping process, the lithium-containing powder is heated and melted in the processing chamber 200 under a rare gas atmosphere. Accordingly, the lithium film can be formed without being spontaneously ignited.

Further, in the present example embodiment, since the lithium-containing powder discharged from the powder discharge opening 254 through the hole 252 of the lithium-containing powder supply unit 250 is heated with the heating gas, it is possible to suppress the lithium from being melted and deposited at the hole 252 while passing through the hole 252.

Furthermore, in order to suppress the lithium-containing powder from clogging the hole 252 of the lithium-containing powder supply unit 250, a shaker may be provided. In this case, for example, at the base end of the lithium-containing powder supply unit 250, there is provided an airtight hopper configured to temporarily store the lithium-containing powder and supply the lithium-containing powder to the hole 252 if necessary. Here, the hopper may be equipped with a shaker.

Figure 5:
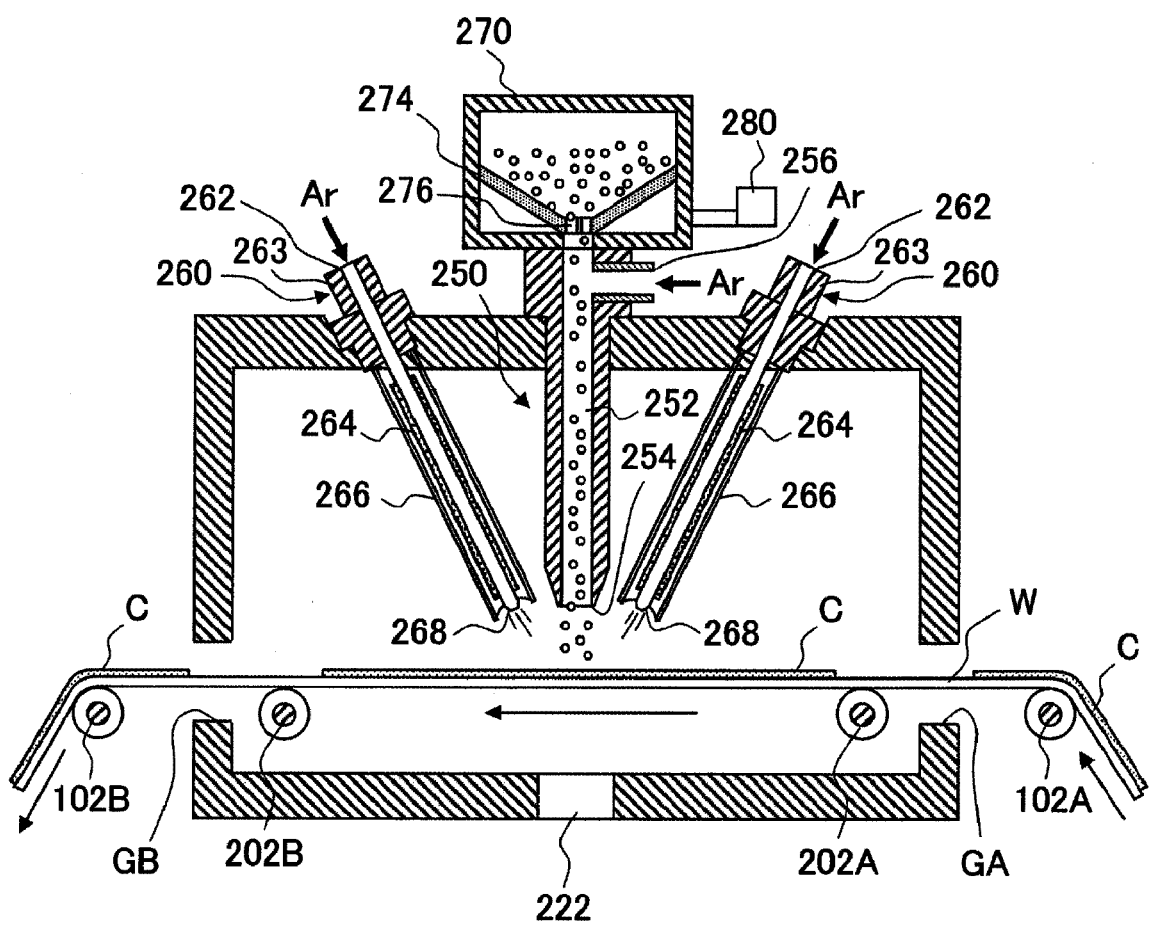
FIG. 5 is a cross sectional view for explaining a case where a hopper equipped with a shaker is provided at a lithium-containing powder supply unit in accordance with the example embodiment.

FIG. 5 illustrates a configuration example of a hopper equipped with a shaker. A hopper 270 depicted in FIG. 5 includes therein a baffle plate 274 that tapers downwardly. At a bottom portion of the baffle plate 274, multiple through holes 276 communicating with the holes 252 are formed. Further, a non-illustrated shutter unit configured to open or close the multiple through holes 276 may be provided. By opening or closing the shutter unit, a timing for discharging lithium-containing powder or an amount of the lithium-containing powder discharged from the lithium-containing powder supply unit 250 may be controlled.

Since the hopper 270 is equipped with a shaker 280, the hole 252 is not clogged with the lithium-containing powder in the hopper 270 by the vibration of the shaker 280, and the lithium-containing power can be discharged through the powder discharge opening 254. Further, the hopper 270 can be detachably attached to the lithium-containing powder supply unit 250. With this configuration, when the lithium-containing powder does not remain in the hopper 270, the lithium-containing powder can be supplied by replacing the hopper 270.

Figure 6:
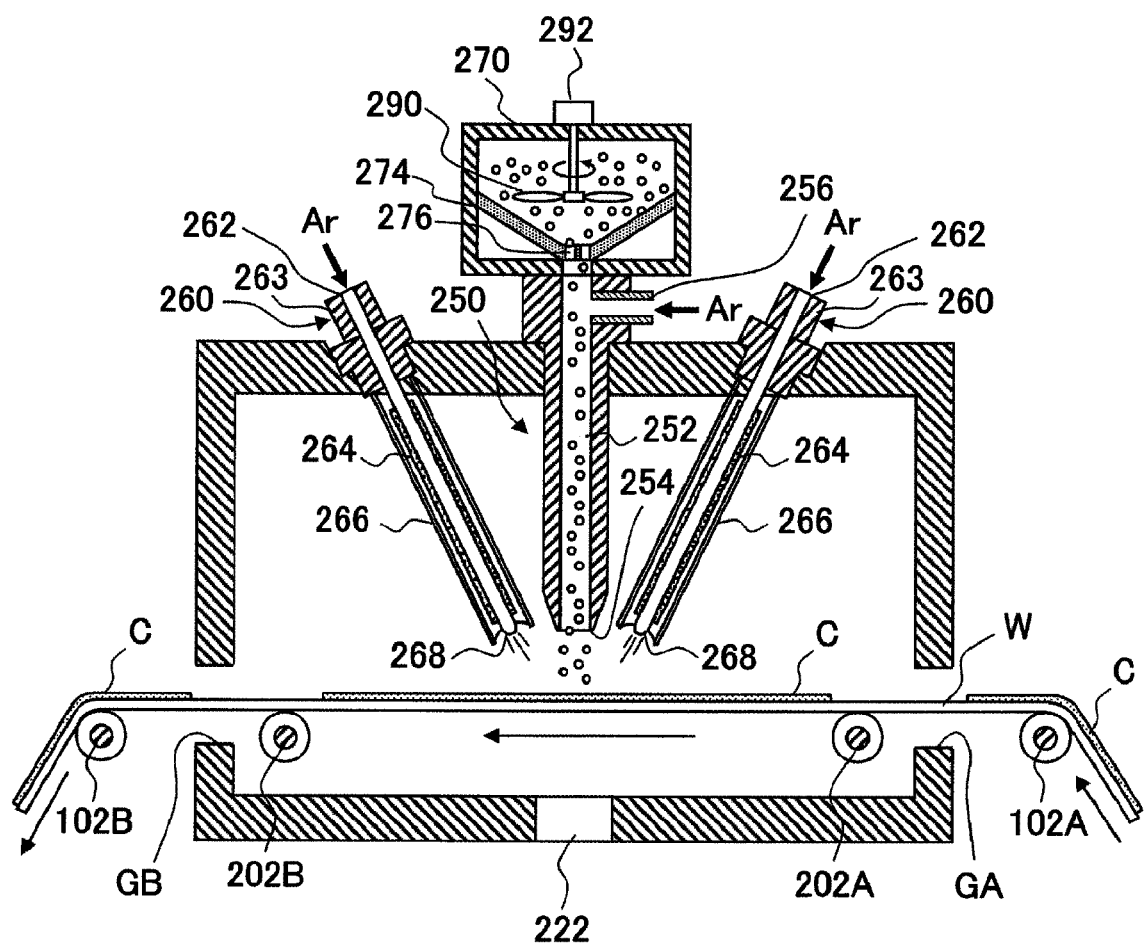
FIG. 6 is a cross sectional view for explaining a case where a hopper equipped with a stirrer is provided at the lithium-containing powder supply unit in accordance with the example embodiment.

Further, instead of providing the shaker 280 at the hopper 270, a stirrer may be provided within the hopper 270. By way of example, as depicted in FIG. 6, a stirrer 290 may be provided within the hopper 270 and rotated by a motor 292. Thus, the lithium-containing powder in the hopper 270 can be stirred and can be discharged through the powder discharge opening 254 without clogging the hole 252.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

By way of example, in the electrode manufacturing apparatus in accordance with the present example embodiment, a lithium film is formed on an electrode material formed on a roll-shaped electrode sheet, so that the electrode material is doped with a lithium ion, but the example embodiment is not limited thereto. Further, the electrode material may be formed on a rectangular electrode sheet. Further, in the electrode manufacturing apparatus in accordance with the present example embodiment, a lithium film can be formed on the electrode material formed on an electrode sheet having a three-dimensional shape as well as a plane shape. Therefore, such electrode materials can be doped with a lithium ion.

The present example embodiment can be applied to an electrode manufacturing apparatus for a lithium ion capacitor and an electrode manufacturing method therefor.

We claim:

1. An apparatus for manufacturing an electrode for a lithium ion capacitor by doping an electrode material on an electrode sheet with a lithium ion, the electrode manufacturing apparatus comprising:

a processing chamber to and from which the electrode sheet is loaded and unloaded;

a rare gas supply unit configured to introduce a rare gas into the processing chamber;

an exhaust device configured to exhaust an inside of the processing chamber to a predetermined vacuum level; and a lithium thermal spraying unit configured to dope the electrode material with the lithium ion by forming a lithium thin film on the electrode material of the electrode sheet loaded into the processing chamber while melting and spraying lithium-containing powder, wherein the lithium thermal spraying unit comprises a lithium-containing powder supply unit configured to discharge the lithium-containing powder toward the electrode material of the electrode sheet; and at least one heating gas supply unit configured to supply a heating gas that melts the lithium-containing powder discharged from the lithium-containing powder supply unit, and wherein the electrode sheet is formed in a roll shape, accommodation chambers configured to accommodate the electrode sheet are respectively provided at both sides of the processing chamber to be communicated with each other, and the electrode sheet is unwound in one of the accommodation chambers to pass through the processing chamber, and then, is wound in the other accommodation chamber, the lithium thermal spraying unit forms the lithium thin film on the electrode material while the electrode sheet is unwound and passes through the processing chamber, the lithium-containing powder supply unit is a substantially plate-shaped member in which multiple holes are formed, and the plate-shaped member is extended in a width direction of the electrode sheet and arranged perpendicularly to the electrode sheet, and the holes through which the lithium-containing powder is supplied are arranged in the width direction of the electrode sheet, and the at least one heating gas supply unit is plural in number, and two heating gas supply units are arranged to be symmetrical with respect to each hole of the lithium-containing powder supply unit in a longitudinal direction of the electrode sheet.

2. The electrode manufacturing apparatus of claim 1, wherein the lithium-containing powder supply unit is provided perpendicularly to the electrode material, and the at least one heating gas supply unit is arranged to be inclined to the lithium-containing powder supply unit such that the heating gas is discharged toward a space between a powder discharge opening of the lithium-containing powder supply unit and the electrode material.

3. The electrode manufacturing apparatus of claim 1, wherein the electrode material is a carbon material.

* * * * *